Figure 1:
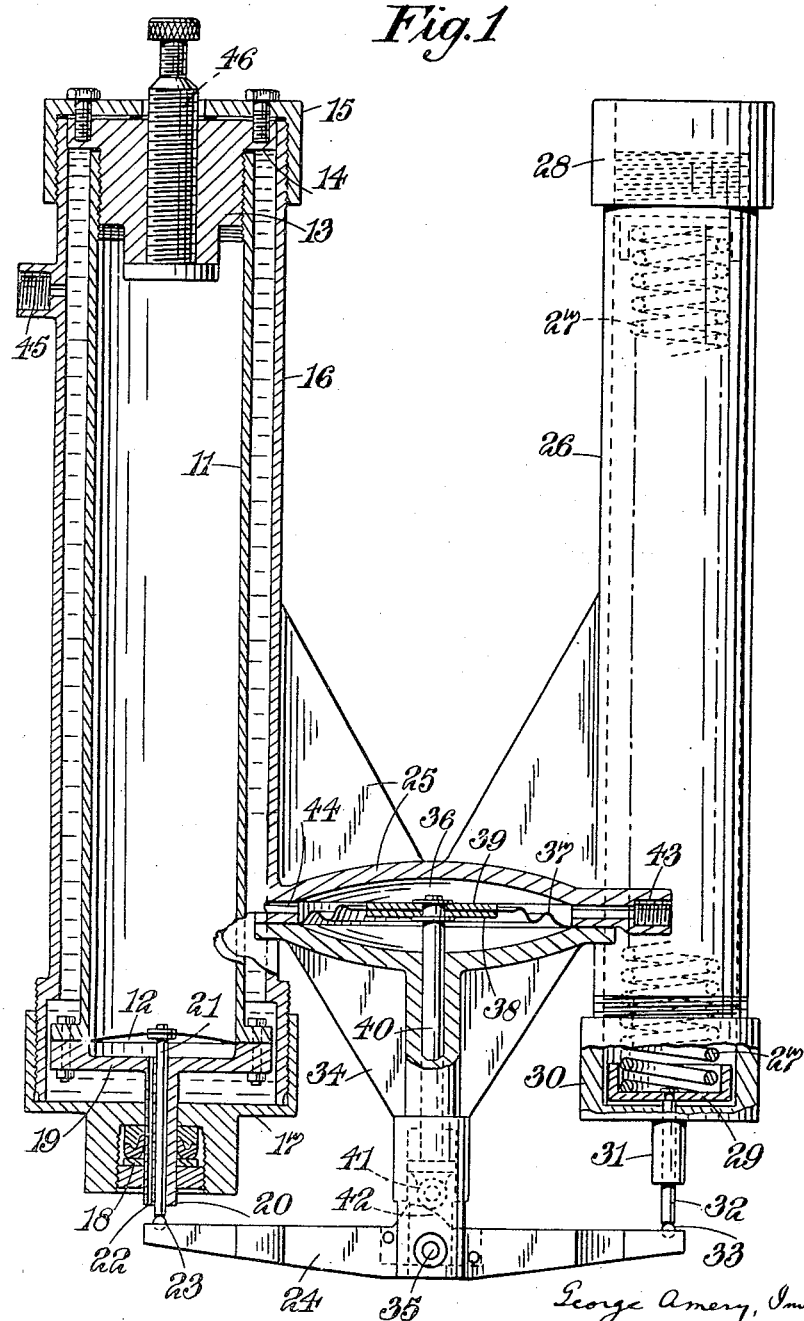

Jan. 23, 1945.  G. AMERY  2,367,707

TEMPERATURE COMPENSATING DEVICE FOR FLUID-CONTAINING APPARATUS

Filed March 23, 1943   2 Sheets-Sheet 1

George Amery, Inventor
by his attorneys
Stebbins and Blenko

Jan. 23, 1945. G. AMERY 2,367,707
TEMPERATURE COMPENSATING DEVICE FOR FLUID-CONTAINING APPARATUS
Filed March 23, 1943 2 Sheets-Sheet 2

INVENTOR
GEORGE AMERY
by his attorneys
Stebbins, Blenko & Webb

Patented Jan. 23, 1945

2,367,707

UNITED STATES PATENT OFFICE 2,367,707

TEMPERATURE COMPENSATING DEVICE FOR FLUID-CONTAINING APPARATUS

George Amery, Harborne, Birmingham, England, assignor to Amery Holdings Limited, Oldbury, Birmingham, England, a British company Application March 23, 1943, Serial No. 480,174 In Great Britain January 6, 1942

7 Claims. (Cl. 60—54.5)

This invention comprises improvements in or relating to temperature compensating devices for fluid-containing apparatus. When fluids, particularly liquids, are contained in vessels and pipe work the expansion or contraction of the parts with variation of temperature is liable to lead to various difficulties. For example, in hydraulic remote control apparatus in which a member at one end of a circuit is connected to a member at the other through the intermediary of a piston and cylinder at each end connected together by pipe work the relative position of the parts at the two ends of the circuit may be modified by variations of temperature. Again, where liquids are enclosed in non-yielding vessels the pressure may vary in accordance with variations of temperature. It is an object of the invention to overcome these and kindred difficulties.

According to the invention the means for compensating for temperature-expansion comprise an expansible compensation member exposed to the temperature to be compensated for, a movable expansion-correcting wall in contact with the fluid in the apparatus and operative connections between the expansible compensator member and the movable wall such as to effect movement of the wall to a degree sufficient to compensate for the expansion or contraction of the liquid due to temperature variations.

The expansible compensator member may be a cell filled with a fluid and having an expansible wall. The fluid may be air or gas or vapour.

In many instances it will be necessary that the operative connections should be such as to be irreversible, that is to say that movement of the expansible member, such as the wall of an air compensator cell can effect movement of the expansion-correcting wall but any tendency to move on the part of the expansion-correcting wall under fluid pressure is resisted by the operative connections, which refuse to transmit such movement back to the wall of the air cell.

The invention includes temperature compensating means for a hydraulic remote control system of the type comprising a piston and cylinder device at the transmitting end operated by an actuating member, a second piston and cylinder device at the receiving end, operatively connected to an actuated member and interconnecting pipe work between the transmitting and receiving ends comprising a movable expansion-correcting wall (piston, or diaphragm or the like) in contact with fluid in the pipe work or the piston and cylinder devices, a fluid-containing compensator cell having an expansible wall exposed to the temperature the effect of which is to be corrected, and operative connections for transmitting movement from the expansible wall of the cell to the expansion-correcting wall of the hydraulic transmission system.

Where the temperature variations are due to the general effect of air temperature upon the fluid-containing parts, such as pipe work and the like, the compensator cell or other expansible member may be exposed directly to such air temperature. In certain cases the effects of expansion may, however, be due to heating of the liquid within the pipes, for example by the liquid being maintained in circulation by a circulating pump. In such a case the compensator cell may be jacketed with the fluid, the expansion or contraction of which is to be corrected. Again, there may be more than one compensator cell, one exposed to the fluid in a jacket and the other to atmospheric conditions and they may co-operate in regulating the temperature expansion-correcting connections.

Figure 2:
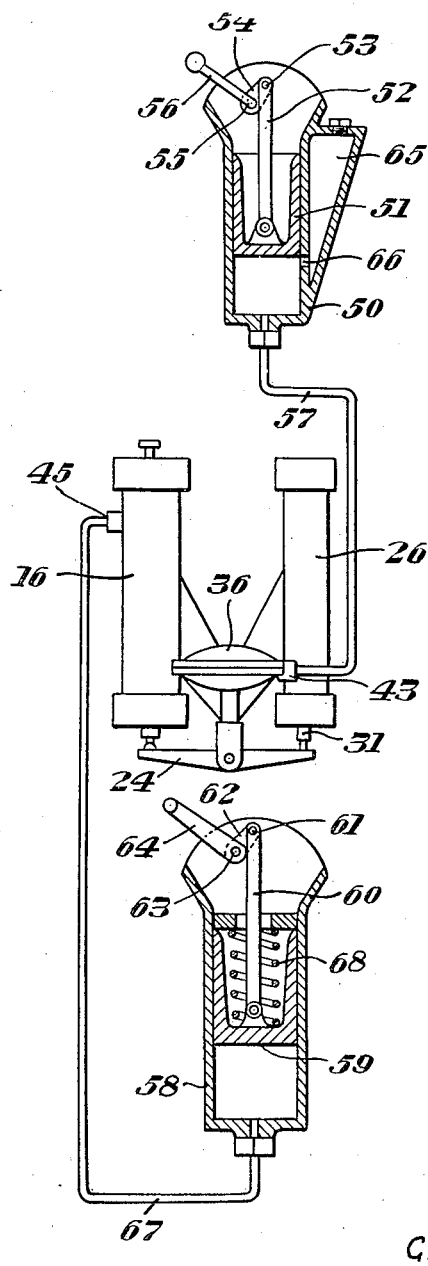

The following is a description, by way of example of one form of apparatus in accordance with the invention, reference being made to the accompanying drawings, in which Figure 1 is an elevation in part section of the temperature compensating unit. Figure 2 is a diagrammatic view of the unit in place in a distant control apparatus.

The apparatus comprises a compensator cell 11 having an expansible wall 12 formed by a flexible diaphragm at one end of the cell. The cell 11 is closed by a plug 13 at one end having a flange 14 screwed to a cap 15. The cap 15 screws on a jacket 16 which surrounds the compensator cell 11 and which is closed at the lower end by another cap 17 provided with a stuffing box 18.

At the lower end of the compensator cell 11 there is a cover 19 secured to the end of the cell so as to enclose and shield the expansible wall 12. The cover has a piston rod 20 which passes through the stuffing box 18 and therefore permits the cell 11 to expand and contract freely relatively to the jacket 16. The expansible wall 12 is secured at its centre to a rod 21 which is free to slide through the centre of the piston rod 20 and an air passage 22 passing through the piston rod 20 parallel with the rod 21 ensures that atmospheric pressure exists in the space between the expansible wall 12 and the cover 19, irrespective of any pressure which may be exerted on the fluid in the jacket 16 which surrounds the compensator cell 11. Thus the cover 19 shields the expansible wall 12 from the pressure of the surrounding fluid.

The rod 21 bears on a ball 23 which is seated in one end of a lever 24.

The jacket 16 is connected by means of a bracket 25 to a second cylinder 26 containing a compression spring 27. The top end of the cylinder 26 carries a screwed cap 28 within which the top end of the spring 27 is seated and by varying the position of the cap by screwing it in or out the force exerted by the spring may be adjusted. The lower end of the spring rests in a cup 29 and the cup in its lowermost position bears on a bottom cap 30 screwed on the cylinder 26. The cap 30 contains a guide 31 for a rod 32 the upper end of which is riveted in the cup 29 and the lower end of which bears on a ball 33 seated in the opposite end of the lever 24 from that which receives the pressure of the rod 21.

To the underside of the bracket 25 there is secured a second bracket 34 which extends downwardly and supports the central pivot 35 of the lever 24.

The brackets 25, 34 are so shaped that they form between them a chamber 36 which is spanned by a corrugated diaphragm 37 the centre of which is clamped between stiffening washers 38, 39 and connected to a sliding rod 40. The rod 40 slides in the lower bracket 34 and carries at its bottom end a cam roller 41 which works on a cam 42 formed on the lever 24. The upper part of the chamber 36 above the diaphragm 37 is provided with a connection 43 by which it may be joined to the pipe work or other convenient liquid-containing portion of a hydraulic remote control apparatus which may, for example, be such as is shown in co-pending patent application Serial No. 483,653. The chamber 36 is also connected by a passage 44 to the interior of the jacket 16 and the jacket has an outlet connection 45 for liquid. The connections of the temperature compensating means, illustrated in the drawings, to the hydraulic remote control apparatus as shown in Figure 2 are such that the liquid is circulated through the chamber 36 and jacket 16 by the operation of the remote control apparatus. Alternatively such circulation may be effected by some special circulating means.

In the drawings, Figure 2, a transmitting unit is shown consisting of a cylinder 50 containing a piston 51 capable of being operated by a connecting rod 52 from a crank pin 53 on a crank 54 pivoted at 55 and connected to an operating lever or actuator 56. The cylinder 50 is connected by a single pipe line 57 to the connection 43. From the connection 45 there extends a pipe line 67 to a receiving unit consisting of a cylinder 58 containing a piston 59 connected by a connecting rod 60 to a crank pin 61 on a crank 62. The crank 62 is pivoted at 63 and connected to an actuated lever 64 which reproduces movement of the actuating member 56. The cylinders 50, 58 and pipe line 57 are filled with hydraulic liquid which may be replenished in the event of leakage from a reservoir 65 on the side of the transmitter cylinder which communicates with the interior of the cylinder through a port 66 when the piston 51 is at the outermost extremity of its stroke. Return movement is effected by spring 68 bearing on piston 59.

The cam 42 of the temperature compensating unit is so shaped that the drive on the rod 40 of the lever 24 through the cam is irreversible, that is to say the lever can work the rod 40, but pressure on the rod 40 by the diaphragm 37 will not be sufficient to rock the lever. This is due to the fact that the pivot 35 of cam 42 is in line with rod 40 and the cam is sloped at an irreversible angle.

The compensator cell 11 may be charged with any desired fluid such as air, gas or vapour. It is shown as provided with a conventional tire inflation check valve 46 by which it may be inflated.

In operation the compensator cell 11 is kept by contact with the hydraulic liquid in jacket 16 at the same temperature as that of the said liquid which is the transmission liquid of the hydraulic remote control apparatus and any variation in temperature of this liquid will cause a corresponding modification of pressure in the compensator cell 11 and variation in the position of the expansible wall 12. Such movement will be transmitted by the lever 24 and rod 40 to the diaphragm 37 and the dimensions of the parts must be so calculated that the amount of movement of the diaphragm 37 under the effects of the change of temperature is sufficient to compensate for variation of volume of the liquid in the remote control system relatively to the pipes and other parts in which the liquid is enclosed. It will be appreciated that the compensatory movement of the diaphragm 37 is readily effected by the action of cell 11 and lever 24 at such times as no movement of the remote control parts is taking place and when therefore there is no pressure in the chamber 36 other than the small pressure due to return spring 68. Should pressure be exerted in the chamber 36 due to operation of the piston 51 the irreversible connection afforded by the cam 42 will prevent yielding of the expansible wall 12 and ensure that all the movement of piston 51 is transmitted to the piston 59.

If desired the connection of the chamber 36 to the jacket 16 may be omitted and the jacket may be pierced with a sufficiency of apertures to permit the compensator cell 11 to be freely exposed to the atmosphere. In cases where the liquid in the pipe lines 57, 67 is at atmospheric pressure such exposure of the cell 11 to the atmosphere will bring the fluid in the cell 11 to the same temperature as that in the pipe line just as effectively as if the cell were jacketed with the liquid.

Any other form of irreversible connection could be adopted, for example some form of servo control operated by a valve moved by the lever 24, and such a device may operate irrespective of the presence or absence of pressure in the pipe work to which the temperature-correction device is connected.

It will therefore be seen that the present invention provides a means of temperature compensation which can be adapted either to suit the case where expansion and contraction of the liquid in a system has to be provided against or alternatively where expansion and contraction of the pipe work as well as the liquid, due to surrounding atmospheric conditions, is the governing factor. The means for inflation of the cell 11 and adjustment of the counter spring 27 provide a ready means of varying at will the sensitivity and rate of correction which is applied by the apparatus, in accordance with the peculiarities of the system the temperature variations of which it is employed to correct.

I claim:

1. Means for compensating for temperature-expansion of fluids in apparatus containing the same, comprising an expansible chamber, a compensator member in the chamber exposed to the temperature to be compensated for, a movable expansion-correcting wall in contact with the fluid in the apparatus, and operative connections between the expansible compensator member and the movable wall such as to effect movement of the wall to a degree sufficient to compensate for the expansion or contraction of the liquid due to temperature variations, said connections being irreversible.

2. Temperature compensating means for a hydraulic remote-control system of the type described comprising a movable expansion-correcting wall in contact with fluid in the system, a fluid-containing compensator cell having an expensible wall exposed to the temperature the effect of which is to be corrected, a casing surrounding said cell, a spring casing parallel to said cell casing and having a compressed spring therein, a bracket connecting said casings and supporting the expansion-correcting wall, and operative connections for transmitting movement from the expansible wall of the cell to the expansion-correcting wall of the hydraulic transmission system including a lever pivoted on the bracket and connecting the expansion-correcting wall to the expansible wall of the cell and to said spring.

3. A temperature-compensating unit for fluid-containing apparatus comprising in combination a closed compensator cell filled with an elastic fluid and having a movable wall, said cell being exposed to the temperature to be compensated for, a chamber in the unit, a fluid-connection to admit fluid from the said apparatus to the chamber, a movable expansion-correcting wall to said chamber, and irreversible operative connections between the movable wall of the cell and the expansion-correcting wall of the chamber such as to permit the fluid in the cell operating the connections but to prevent the fluid in the chamber from so doing.

4. A temperature-compensating unit as claimed in claim 3, wherein the irreversible connections comprise a push-rod operated by the movable wall of the cell, a lever engaged by the push rod, a cam on the lever and a push rod in axial alignment with the pivot of the lever and engaging the cam, said push rod serving to move the movable expansion-correcting wall.

5. A temperature-compensating unit as claimed in claim 3, wherein the cell is jacketed with the fluid of the fluid-containing apparatus.

6. A temperature-compensating unit comprising in combination a closed elongated compensator cell filled with an elastic fluid and having a movable wall at one end, a spring-case extending parallel to said cell spaced therefrom, a spring therein, a chamber having a movable expansion-correcting wall located between said cell and spring case, a pipe connection to said chamber, a push rod extending from the said expansion-correcting wall, a lever pivoted substantially in line with said push-rod and carrying a cam to engage the same and means connecting one end of the lever with the movable wall of the cell and the other end thereof with said springs.

7. A temperature-compensating unit as claimed in claim 6, wherein the cell is enclosed within a jacket, the chamber is connected to the space between the jacket and the cell and the jacket carries a second pipe connection.

GEORGE AMERY.